July 9, 1968  H. W. HUFFMAN ET AL  3,391,863
DATA CARD PUNCHING DEVICE
Filed Aug. 6, 1965  7 Sheets-Sheet 7
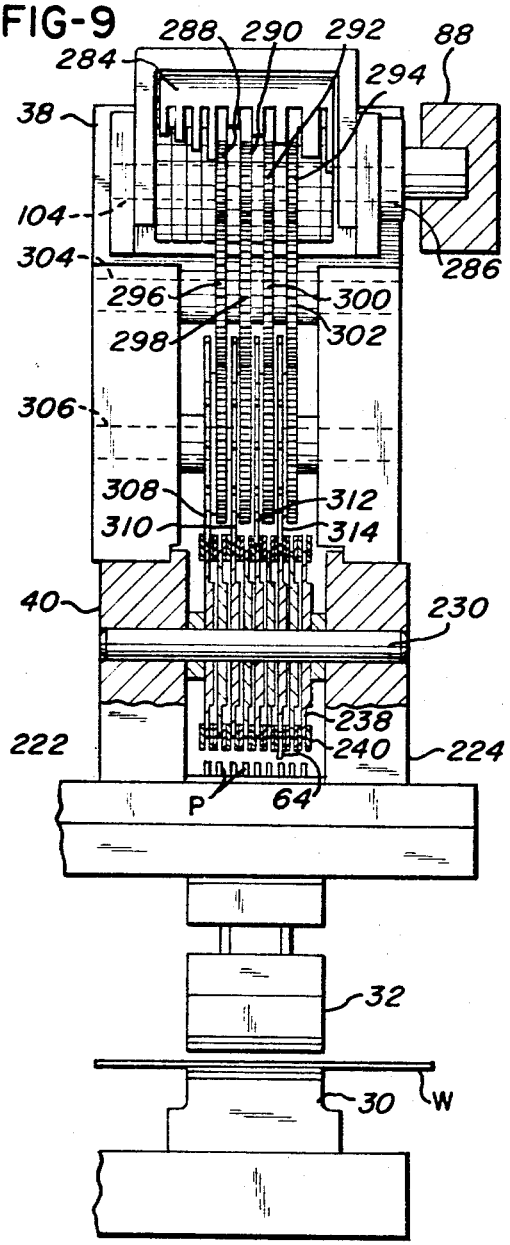
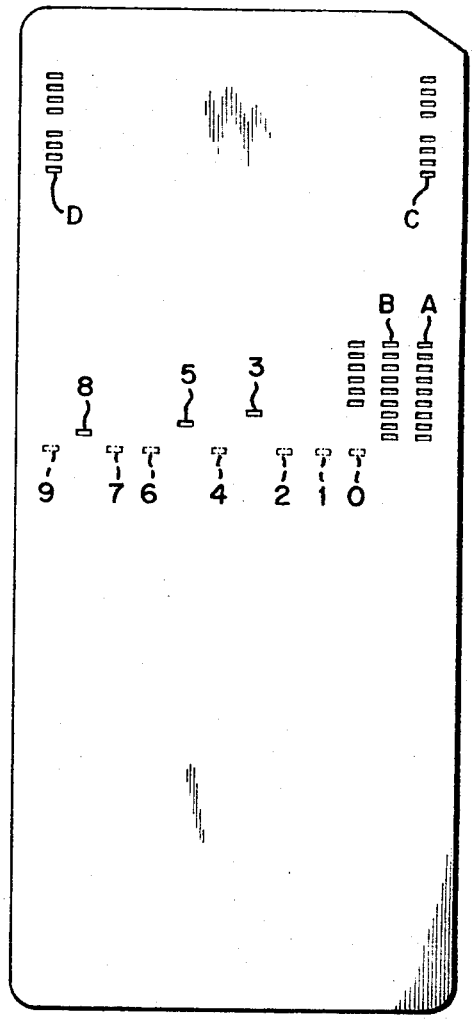
INVENTORS
ROBERT W. MORNER
HAROLD W. HUFFMAN
BY J. Warren Kinney Jr.
ATTORNEY

# United States Patent Office 3,391,863
Patented July 9, 1968

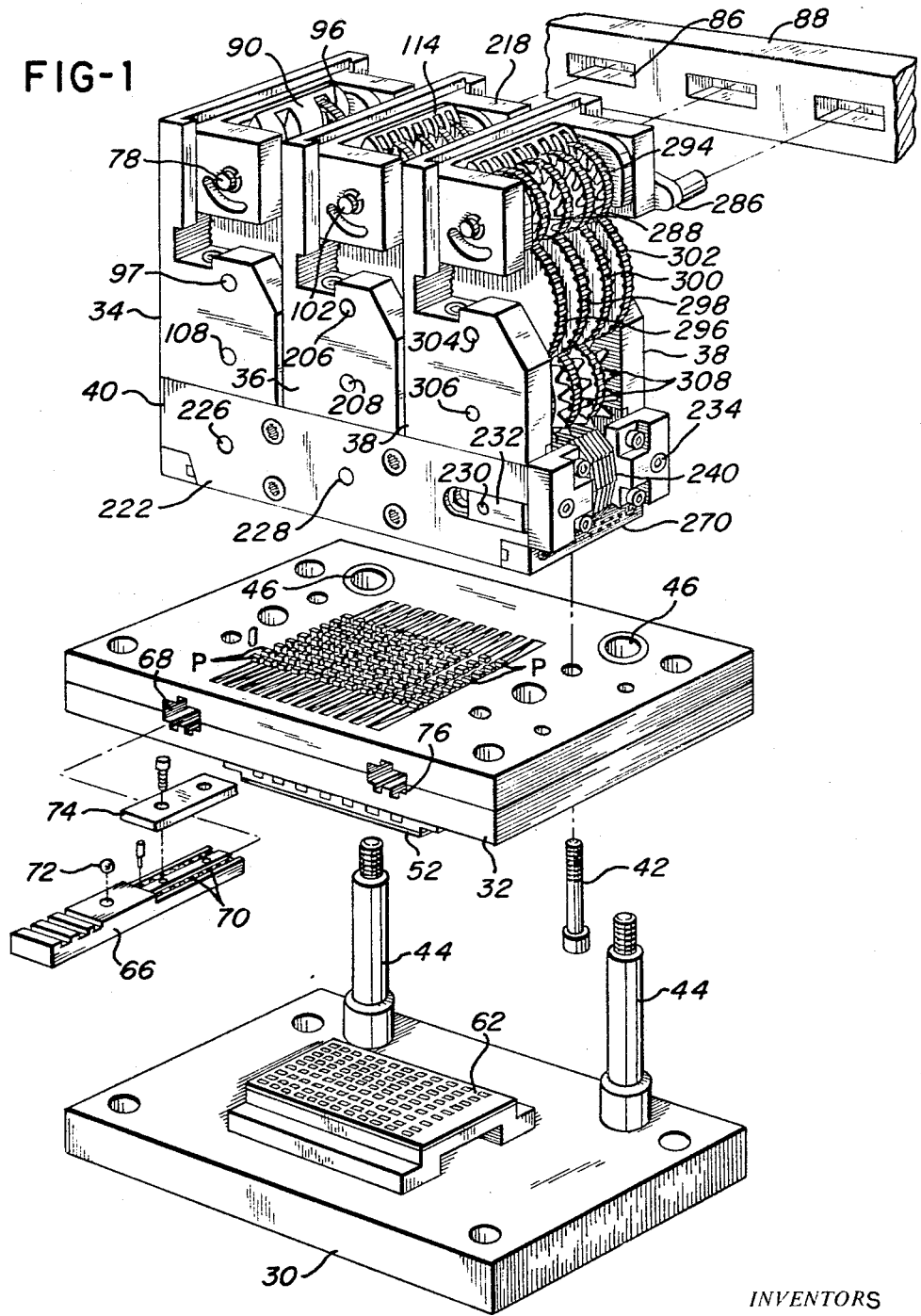

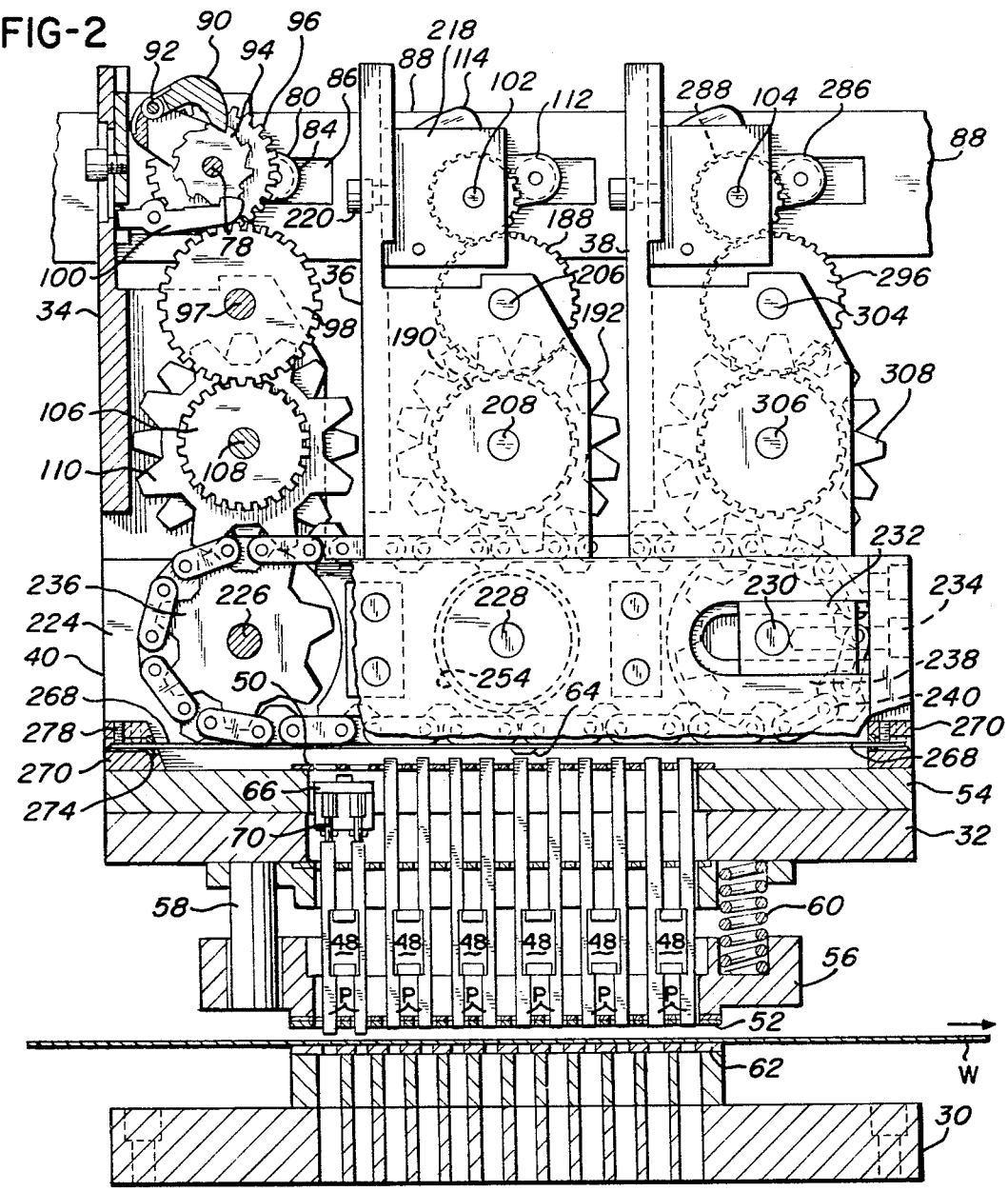

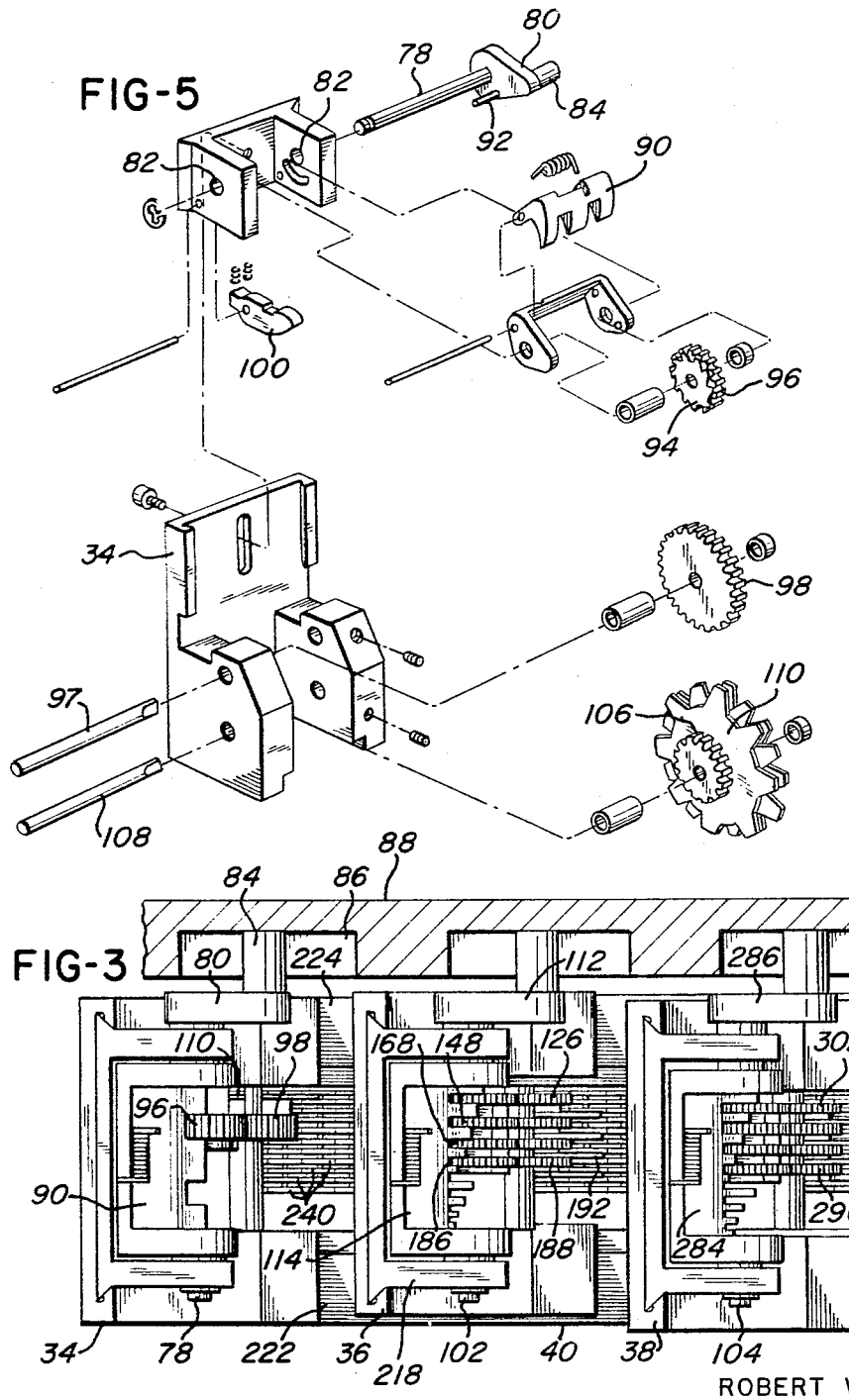

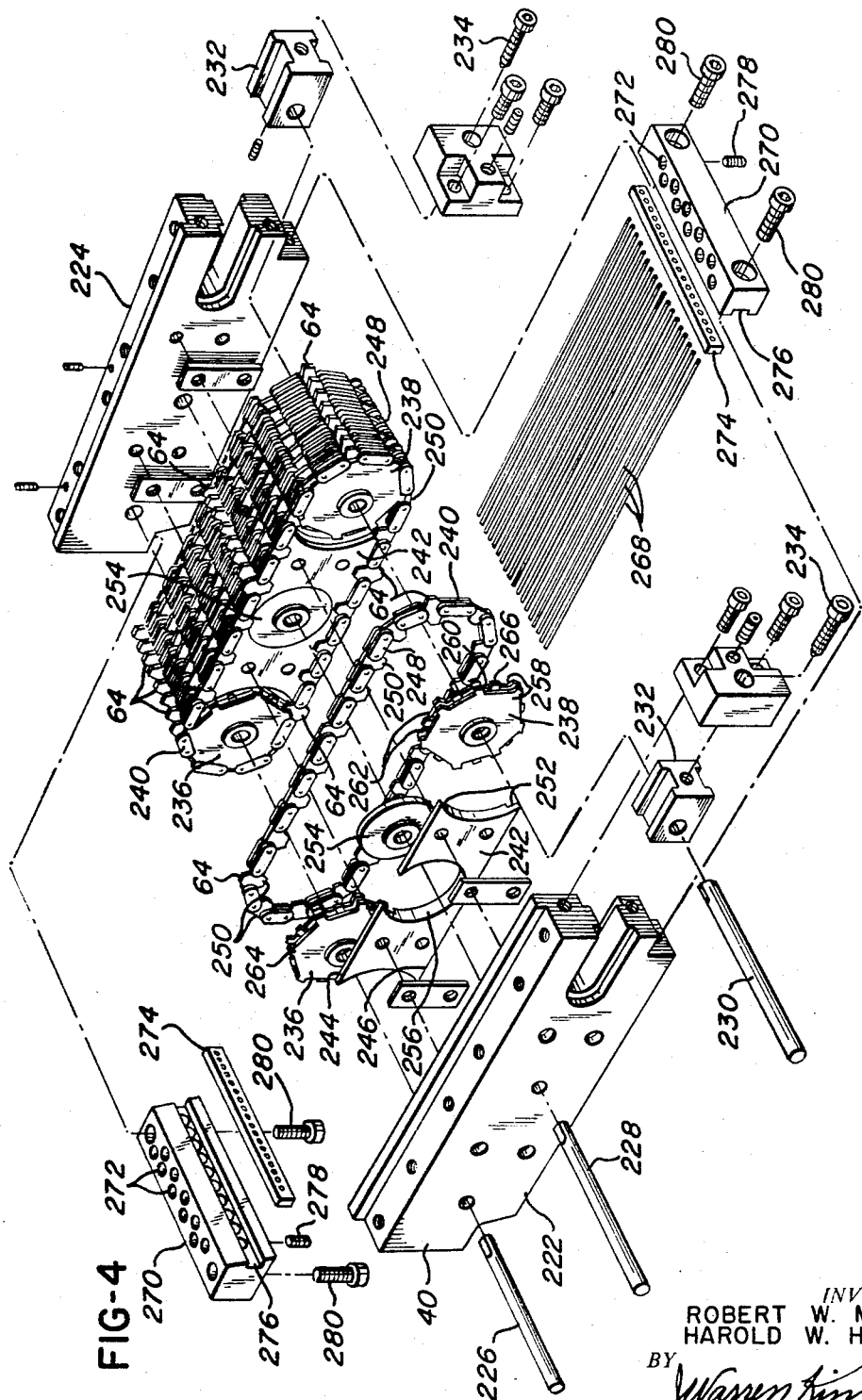

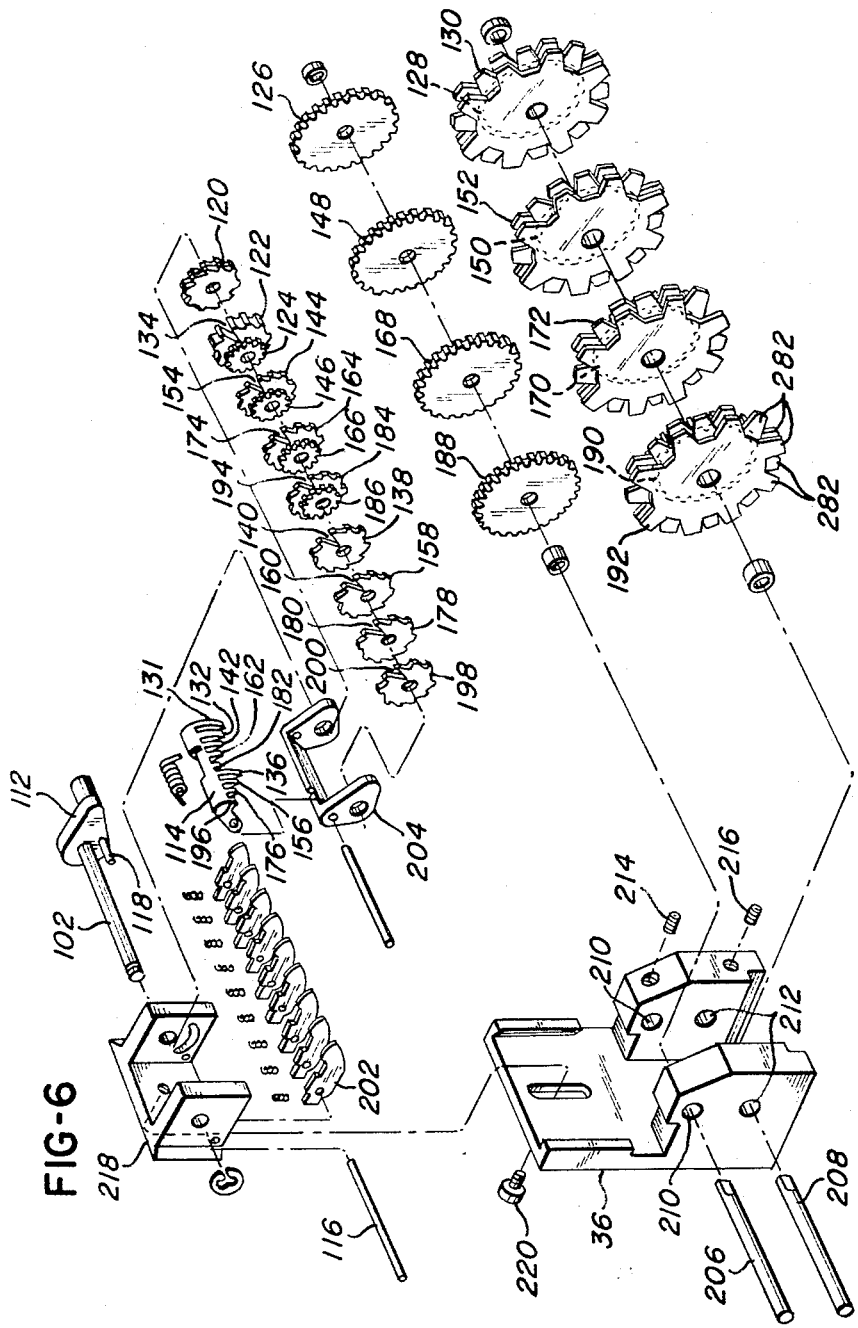

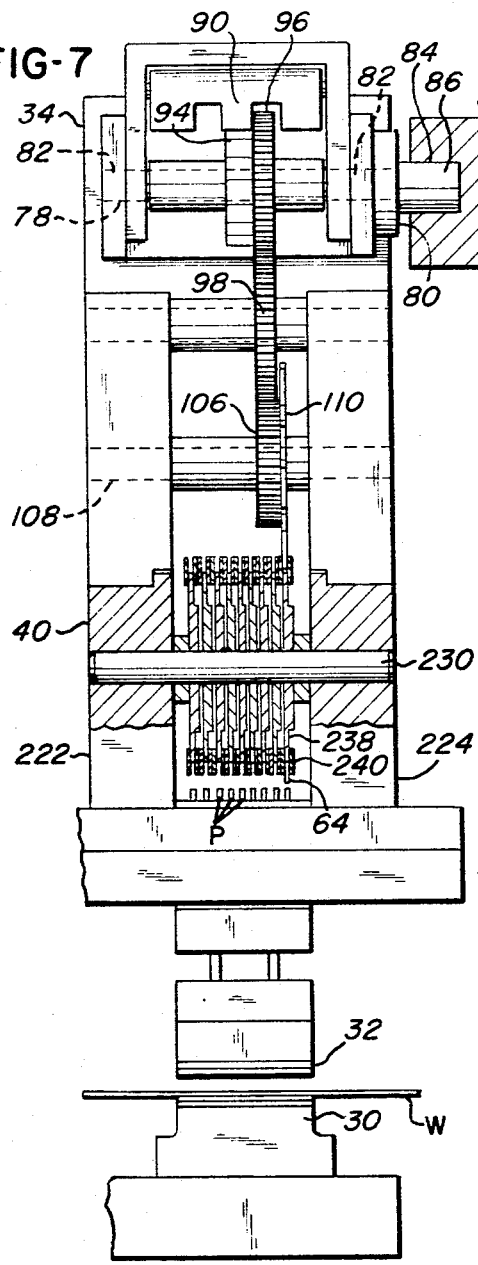
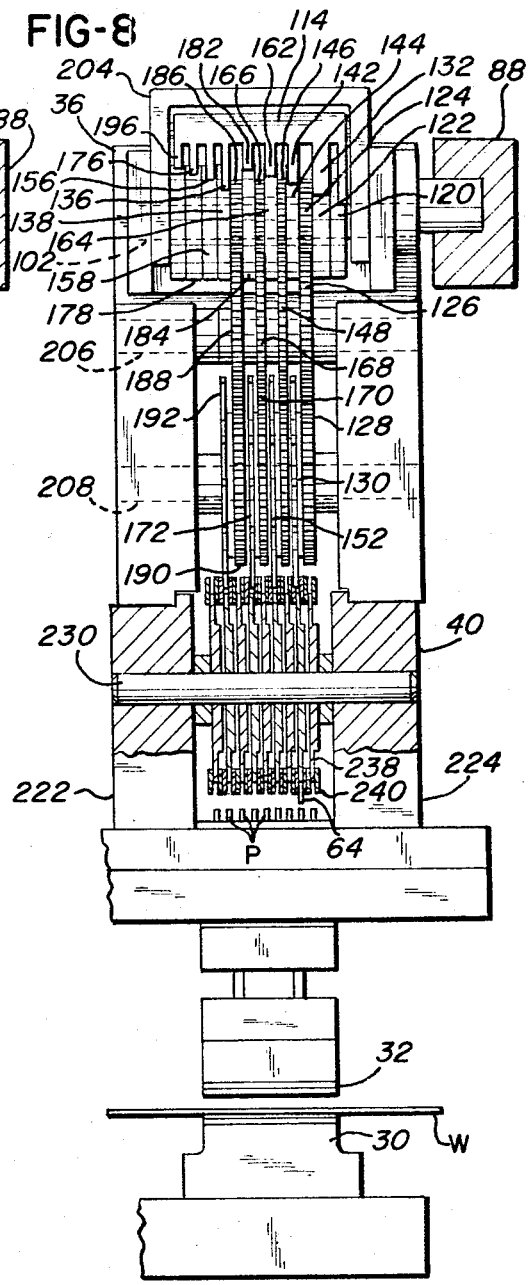

3,391,863
DATA CARD PUNCHING DEVICE
Harold W. Huffman and Robert W. Morner, Hamilton, Ohio, assignors to The Hamilton Tool Company, Hamilton, Ohio, a corporation of Ohio
Filed Aug. 6, 1965, Ser. No. 477,800
36 Claims. (Cl. 234—61)

ABSTRACT OF THE DISCLOSURE

The data card punching device is operative upon a continuous long movable web of connected but separable coplanar data cards, for punching slots in the cards and thereby distinguishing them one from another, the slots as groups in every card being differently oriented to one side edges and one end edge thereof. In the construction of the punching device, use is made of several commercially available counters, or counter heads, adapted to control operation of a multiplicity of card punches incorporated in the device, the counters operating in conjunction with a simplified punch backstop unit for determining which of the punches are to be conditioned for data card penetration. Elements of the punch backstop unit carry traveling stops or detents which are driven by the counters to traverse the coplanar butt ends of punches arranged in straight rows, for so backstopping selected punches that their cutting ends may penetrate and slot the data cards. For compactness of construction, the counters may be offset from one another upon the backstop unit, and in cases of high speed punching two identical data card punching devices may be arranged in tandem, operating in alternation to punch successive cards of the same movable web.

---

This invention relates to a data card punching device, the purpose of which is to operate upon a continuous web of connected coplanar data cards, such as IBM cards, for punching slots in the cards, while the web intermittently advances, thereby to identify or distinguish the cards by means of slots punched therein at different locations upon the cards.

As a practical example, it may be desirable to process a web constituted of 100,000 successive coplanar data cards each defined by a series of incomplete knife cuts, whereby the cards at a later time may be separated from one another and stacked flatwise upon one another to form a package. The processing may involve punching slots in each card to distinguish them one from another, by locating the punched slots upon the cards in such manner that no two cards will carry the same arrangement of punched slots with reference to two meeting edges of a card. Accordingly, by punching out the slots in a predetermined order as the web passes through the punching device, the succession of cards may be in effect "numbered" consecutively from 1 to 100,000, using slots and groups of slots to represent the card numbers.

In FIG. 10 is shown a data card having, in addition to other slots, a group of three slots located in the midsection of the card. The group of three slots, by reason of their respective distances from the upper edge and one side edge of the card, represents the numral 358, which is the number of the card. The next consecutively numbred card No. 359, would be distinguished from card No. 358, by substituting for slot 8 a similar slot whose location would be to the left of slot 8 but at the same distance from the upper edge of the card. In establishing a card number by means of the punched slots, the number of slots in a group will be the same. That is, a card to be numbered with any figure between 0 and 9, inclusive, will have but one punched slot in the right hand column and all slots to the left in this group will be in the position representing zeros; a card to be numbered with any figure between 10 and 99, inclusive, will have two punched slots and all of those to the left in this group will represent zeros; a card to be numbered with any figure between 100 and 999, inclusive, will have three punched slots with all of those to the left in this group representing zeros, and so on.

An object of the present invention is to provide improved means having the advantages of compactness, simplicity, and reliability of performance, to punch a succession of data cards in web form, with slots or openings which are representative of numbers for the cards, the cards being thereby in effect numbered consecutively or in some other regular order as may be required.

Another object of the invention is to provide a data card punching device for the purpose stated, which compared with prior devices, is relatively inexpensive, durable, light in weight, and easily serviced with substantial savings of time and skilled labor.

A further object is to provide means in a device of the character stated, to ensure great accuracy of punching and minimal wearing of the punches, dies, and associated components of the device.

Another object is to provide in a device of the character stated, a unitary construction which advantageously minimizes the speed, weight, and the extent of movement of working parts, to prolong the serviceability thereof and eliminate the need for frequent replacements or adjustments.

A further object is to provide a punching device of the character stated, which is unitary and therefore quickly and easily replaceable by another similar unit in the event of malfunction.

The foregoing and other objects are attained by the means described herein and illustrated upon the accompanying drawings, in which:

FIG. 1 is a perspective view of the data card punching device, shown partly exploded for clarity of disclosure.

FIG. 2 is a side elevational view, partly in vertical cross-section, showing the punching device preparatory to punching one card of a continuous web of connected data cards.

FIG. 3 is a top plan view of the punching device of FIG. 1, omitting the two lower heads which carry the punches and the dies.

FIG. 4 is an exploded perspective view of a punch backstop unit, which in FIG. 1 is located intermediate the counter heads and the punch head.

FIG. 5 is an exploded perspective view of a digits counter head.

FIG. 6 is an exploded perspective view of another counter head, differing in construction from the counter head of FIG. 5.

FIG. 7 is a front elevation of the digits counter head of FIG. 5, shown partly in cross-section, and indicating its relationship to the subjacent punch and die heads.

FIG. 8 is a front elevation of the counter head of FIG. 6, shown partly in cross-section, and indicating its relationship to the subjacent punch and die heads as in FIG. 7.

FIG. 9 is a view similar to FIG. 8, showing a third counter head, such as the one at the extreme right in FIG. 1.

FIG. 10 is a plan view of a data card identified by punched slots representing a card number, and including other grouped slots unrelated tot he card number slots.

A typical data card, in this instance an IBM punched card, is illustrated by FIG. 10 at full scale dimensions. It will be noted that the card is punched with elongate slots at various locations, some being in groups indicated at A, B, C and D. The lettered groups may represent data of one kind or another, such as name, address, account number, and type of account, all of which is of no concern to the present invention. That which concerns the present invention is the punching of the remaining slots idicated by the digits 0 to 9, inclusive, which in effect number the card as by means of the punched slots 3, 5 and 8, shown in full lines. The punched slots 3, 5 and 8 indicate that the card is No. 358 of a series which may comprise hundreds, thousands, or millions of cards numbered consecutively or in some other regular order.

The card is of sufficient width to receive punched slots in addition to 3, 5 and 8, so as to represent also the remaining digits 0, 1, 2, 4, 6, 7 and 9, or a total of ten digits, in addition to the groups A and B. In larger cards, groups or lines of slots similar to groups A and B might be added to the right of groups A and B, but this variation is of no concern to the present invention which is directed to punching the digital slots only.

If, by way of example, one million cards are to be punched to distinguish them as consecutively numbered cards, the data card punching device of the present invention will perform the service. The cards will be presented to the punching device as a web, with successive cards connected along their edges as by means of incomplete transverse slits that permit the cards to be torn one from another and thereby individualized at a later time following the punching operation performed by the device herein disclosed. The width of the web may be one or several cards wide making one or more rows of cards. In either case, the web will be fed to the punching device with an edge of each card disposed at right angles to the direction of web advancement. The feed will be intermittent, to place successive cards in position for perforating by the punches of the punching device. The web of course, can be one or more card thicknesses, and its length will be equal to all the cards in one row.

In FIGS. 2, 7, 8 and 9, the web of cards is denoted by the reference character W, and a card of the web will be understood to approximate in width the width of a bank of dies in die head 30, and of a bank of punches in punch head 32. That is, web W as shown, includes more than one data card. It may be said to comprise one data card positioned between the heads, and portions of a preceding card and a following card. In the operation of the punching device, that card which is positioned between the heads will be punched incident to closing of the space between the die head and the punch head. Following the punching operation upon such card, the heads will separate to permit advancement of a succeeding card (not necessarily a next succeeding card), into punching position between the die head and the punch head.

With reference to FIGS. 1 and 2, the punching device is seen to comprise a bank of counters or counter heads 34, 36, and 38, superposed in tandem upon a punch backstop unit 40. The punch backstop unit 40 is in turn fixed upon punch head 32, as by means of screws 42, FIG. 1. Die head 30 carries guide pins 44 which slide in bushings 46 of the punch head, to permit precision relative movement of heads 30 and 32 toward and from one another. The counter heads are fixed relative to the punch backstop unit 40. It may here be noted briefly, that the purpose of the punch backstop unit is to condition for punching, certain ones of the punches for entry into the die slots, while permitting other punches to idle without penetrating a data card as the punch and die heads come together. The counter heads determine which punches of the punch head are to be conditioned for data card penetration, and the punch backstop unit provides the means for so conditioning the punches selected, that their lower cutting ends will penetrate and slot the card.

The punches are denoted by the letter P, and each with the exception of two at the left end of FIG. 2 is freely reciprocable vertically in a shank guide 48, FIG. 2. The upper and lower ends of punches P project through perforated guide plates 50 and 52. Plate 50 is fixed to the top member 54 of punch head 32, and top member 54 in turn supports the punch backstop unit 40. Plate 52, which is sloted to afford lateral support for the lower or cutting ends of punches P, is fixedly mounted upon the lower face of a cushion plate 56 constituting an element of the punch head. Cushion plate 56 is slidable vertically upon guide pins 58, and is biased downwardly to a lower limit of travel by compression springs 60.

From the foregoing, it will be understood that descent of punch head 32, or upward movement of die head 30, will compress web W between plates 52 and 62, bringing the lower ends of all punches P into contact with the web. If the butt end of any punch is backstopped, as by means of a traveling overhead stop or detent 64, FIG. 2, the punch so restrained in its upward movement will be forced through web W to cut a slot in the web. All other punches, however, will be free to idle upwardly while resting upon the web, without penetrating the web.

Springs 60 are subjected to limited compression, and serve to yieldingly hold the web against lateral shifting between plates 52 and 62 during the punching operation. It will be understood also that the extent to which springs 60 are compressed determines the extent to which a backstopped punch may penetrate the die plate 62 while punching the web material.

In passing, it may here be noted that some of the punches P, notably those at the left side of FIG. 2, may be preset and extended to punch the web at every punching cycle, without being influenced by a traveling detent such as 64. Such preset punches may produce slots such as the A and B groups of FIG. 10, in all cards presented to the apparatus. The remaining punches, whose butt ends extend above guide plate 50, will perforate the card or web only when backstopped by a traveling detent 64. Detent 64 may assume a position over any one of the ten slidable punches extended above plate 50, as will later be explained.

Reverting to the preset punchs above mentioned, these may be held extended by means of a retaractable slider 66 (see also FIG. 1), insertable in a way 68 above the presettable punches, and carrying rows of depending pins 70 to overlie and backstop said punches at all times. The slider, being removable from the way, can be altered with respect to the number of pins 70 carried thereby, when desired. To assure alignment of pins 70 with their resuective punches, the slider may be provided with a spring ball 72 receivable within a notch or recess (not shown), located inside the way. The reference character 74 indicates a removable cover plate for pins 70.

A second way 76, (FIG. 1), similar to way 68, may be provided in the punch head to receive slider 66 in the event that punches P at the right end of the punch group are to be immobilized or preset. Ordinarily, however, the second way may be considered an unnecessary fixture, and particularly so far as the present invention is concerned.

Counter heads 34, 36 and 38 may be commercial heads revised to accommodate them to the service required. Each counter head includes a primary rocker shaft carrying a lever to be oscillated for step-rotating the counter wheels of the head. Counter head 34, which is the digits counter, is illustrated in detail upon FIGS. 1, 2, 3, 5 and 7. It includes a rocker shaft 78 carrying a lever 80 to be rocked through an arc of about 45 degrees, for rocking the shaft in its bearings 82. A roller 84 on lever 80 engages an elongate slot 86 of an actuator bar 88, so that the lever is rocked to and fro as actuator bar 88 is power-actuated to rhythmically rise and fall bodily within limits, the bar remaining substantially horizontal. The actuator bar is provided with three slots such as 86, for rocking the levers of the three counter heads simultaneously.

A spring-loaded pawl 90, FIG. 2, having pivotal connection with lever 80 at pin 92, is adapted to engage a ratchet wheel 94 fixed on shaft 78, so as to rotate the ratchet wheel step by step, in one direction of rotation, incident to each elevating and lowering cycle of actuator bar movement. A pinion gear 96 fixed upon the rocker shaft 78, moves with the ratchet wheel and transmits the stepping movements thereof to an intermediate gear 98 meshed with pinion 96. Gear 98 may be rotatable upon a shaft 97. The secondary pawl indicated at 100, is a holding pawl spring-pressed against the ratchet wheel, to preclude retragrade movement of the latter during the idling stroke of driving pawl 90. Thus, with every complete cycle of movement of actuator bar 88, the main shaft 78 of counter head 34 is partially step-rotated in one direction. In like manner, the rocker shafts 102 and 104 of counter heads 36 and 38 are step-rotated by the action of actuator bar 88, at the same time.

With further reference to FIG. 2, intermediate gear 98 is meshed with a terminal gear 106 rotatable upon a shaft 108, and to gear 106 is fixed a star wheel 110. The star wheel is the final wheel carried by counter head 34, and step movements are imparted thereto by way of gears 96, 98 and 106.

By means of a generally similar arrangement of gearing, star wheels associated with counter heads 36 and 38 are step-rotated, but at different frequencies, as will be explained.

The star wheels of counter heads 34, 36, 38, are arranged to drive and actuate the mechanism of punch back-stop unit 40, for positioning a series of detents such as 64 in register with the upper ends of selected ones of the free punch P, whereby to cause the selected punches to slot the data card of web W.

Counter head 34 is properly referred to as the units digit head, since its function is to control movements of those punches P which perforate a data card with slots representing the units digit of a compound number. That is, units digit head 34 controls the action of only ten punches representing the units digits 1, 2, 3, 4, 5, 6, 7, 8, 9 and 0. The ten punches referred to are the ten "free" punches P indicated upon FIG. 2, and these ten are arranged in a straight row. The same ten punches are shown also upon FIG. 1, and are the ten in the row closest to the viewer, beginning the count at the third from the left end of the punch bank and reading toward the right end, since the first two punches at the left end of the bank are fixed punches, as was previously pointed out in describing FIG. 2 earlier herein.

Counter head 36 properly may be referred to as the 10's counter, since it operates once at every tenth advancement of counter 34, to add ten to each successive set of digits turned up on the units digit counter. The remaining counter 38 is referred to as the 100's counter, since it advances one step at every 100th advancement of the units digit counter, to add 100. Otherwise stated, the 100's counter advances one step to every ten advancements of the 10's counter.

Referring now to FIG. 8, which illustrates the 10's counter 36, and FIG. 6 which details it, the rocker shaft 102 as previously explained will be rocked by actuator shaft 88 through its lever connection 112. The spring-loaded driving pawl 114, being pivoted upon shaft 116, and having a pintle connection at 118 with lever 112, will rock in correspondency with lever 112 to engage and advance by one tooth, the ratchet wheel 120 with each cyclic movement of actuator 88. Ratchet wheel 120 steps ten times to complete a full rotation, as does also the ratchet wheel 94 of units digit counter 34.

In completing a full rotation, ratchet wheel 120 by reason of its having one deep tooth, permits pawl 114 to dip and engage one tooth of a second ratchet wheel 122, for imparting to said second ratchet wheel a one-tenth rotation. This action occurs nine times before any other ratchet wheel of the 10's counter group becomes subject to actuation by pawl 114.

Ratchet wheel 122 carries an attached pinion 124, which drives an intermediate gear 126, which gear 126 in turn drives a gear 128 that is fixed to one face of a star wheel 130. Wheel 122 is step-advanced by nose 132 of pawl 114.

At its tenth step of rotation, a deep tooth 134 of ratchet wheel 122 is presented to pawl nose 132, permitting the pawl to dip so as to engage its nose 136 with a ratchet wheel 138. This wheel 138 is an idler, and carries no drive pinion.

At its tenth step of rotation, idler 138 presents a deep tooth 140 to the nose 136 of pawl 114, permitting the pawl to dip its nose 142 onto the teeth of ratchet wheel 144. To one face of wheel 144 is fixed a pinion 146, which drives an intermediate gear 148. Gear 148 in turn drives a gear 150 affixed to one face of a star wheel 152, whereby the latter may be step-rotated by the action of ratchet wheel 144.

Ratchet wheel 144 upon one complete rotation, presents a deep tooth 154 to pawl nose 142, permitting the pawl to dip its nose 156 onto the teeth of an idler ratchet wheel 158. Wheel 158 carries no pinion, and therefore performs no driving function.

Wheel 158, at ten steps of rotation, presents a deep tooth 160 to the nose 156 of pawl 114, permitting the pawl to dip its nose 162 onto the teeth of a ratchet wheel 164 for step-rotating the wheel 164. Wheel 164 has a pinion 166 affixed to one face thereof, which pinion drives an intermediate gear 168. Gear 168 in turn drives a gear 170 which is affixed to one face of a star wheel 172. Thus, star wheel 172 is step-rotated by the action of ratchet wheel 164.

Ratchet wheel 164, upon one complete rotation, presents a deep tooth 174 to pawl nose 162, permitting the pawl to dip its nose 176 onto the teeth of an idler ratchet wheel 178. Wheel 178 carries no pinion, and therefore performs no driving function.

Wheel 178, at ten steps of rotation, presents a deep tooth 180 to the nose 176 of pawl 114, permitting the pawl to dip its nose 182 onto the teeth of a ratchet wheel 184, for step-rotating the latter. Ratchet wheel 184 has a pinion 186 affixed to one face thereof, which pinion drives an intermediate gear 188. Gear 188 in turn drives a gear 190 which is affixed to one face of a star wheel 192. Thus, star wheel 192 is step-rotated by the action of ratchet wheel 184.

Ratchet wheel 184, upon one complete rotation, presents a deep tooth 194 to pawl nose 182, permitting the pawl to dip its nose 196 onto the teeth of an idler ratchet wheel 198, for step-rotating the latter wheel. Wheel 198 carries no pinion, and therefore performs no driving function.

Ratchet wheel 198 needs no deep tooth but has one because of mass production. As ratchet wheel 198 completes one revolution, all of the ratchet wheels will have returned to the original position and the cycle of operation of counter 36 will repeat.

In FIG. 6, the spring-actuated pawls grouped at 202 are holding pawls, operative in conventional fashion to preclude reverse rotation of all ratchet wheels step-rotated by the driving pawl 114. The reference character 204 denotes a carriage in which the ratchet wheels are embraced while supported upon rocker shaft 102. The shafts indicated at 206 and 208 are supported at their ends in openings 210 and 212 of the counter head. Shaft 206 rotationally supports the intermediate gears 126, 148, 168 and 188, whereas shaft 208 rotationally supports the star wheels 130, 152, 172 and 192, and the affixed gears 128, 150, 170 and 190. Set screws 214 and 216 lock the shafts 206 and 208 to the counter head. A bracket 218 secured to head 36 by a screw 220, supports the carriage 204.

It should here be noted that the star wheels 130, 152, 172, and 192, are in FIG. 8 illustrated in simplified form so as to avoid complicating the disclosure of FIG. 8. The star wheels in proper detail are illustrated by FIG. 6, and by other figures of the drawings (see also FIG. 5).

The foregoing explanation of FIGS. 6 and 8, applied to the 10's counter 36, applies as well to the 100's counter 38 of FIG. 9, since the details and the operation of the counters 36 and 38 are identical. Both embrace the same number of ratchet devices and star wheels, and the driving mechanism for the star wheels is the same in both counters. The difference between counters 36 and 38 is in the mounting thereof atop the punch backstop unit 40, wherein FIG. 3 it is clearly indicated that counter 36 is offset from counter 38 as to alignment upon unit 40. Counter 34 also is out of alignment with respect to counters 36 and 38, for a purpose later to be explained.

The punch backstop unit 40 is next to be described. As best shown in FIGS. 1 to 4, and particularly in FIG. 4, this unit comprises a pair of spaced parallel rails 222 and 224 which form a housing for the mechanism of the unit. The housing rests upon and is fixed to the punch head 32, to overlie the butt ends of the punches P thereof. The several counter heads 34, 36, 38 rest upon and are fixed to the rails of the unit 40, and present their several star wheels to the upper portion of the punch backstop unit.

Rails 222 and 224 support the opposite ends of three transverse parallel shafts 226, 228 and 230, the shaft 230 being preferably accommodated in slide blocks 232 that are adjustable lengthwise along the rails by means of adjusting screws 234.

Shaft 226 rotatably supports a series of sprockets 236, whereas shaft 230 rotatably supports a series of similar sprockets 238. In the embodiment illustrated, each shaft supports nine sprockets, each of which is individually rotatable. In any event, the number of sprockets on each shaft should correspond with the total number of star wheels carried by counter heads 34, 36 and 38.

As FIG. 4 clearly indicates, a sprocket 236 is coplanar with a sprocket 238, and the two support an endless chain or carrier 240. There are nine such chains trained upon nine pairs of sprockets, and in the assembled condition of the unit, the chains lay in closely spaced parallel planes so that any chain and sprocket assembly may be driven independently of any other such assembly, with the sprockets rotating on shafts 226 and 230. The several chains may be drawn taut about their respective supporting sprockets, by adjusting the slide blocks 232.

To maintain a proper spacing of the chains from one another, and to back up the upper and lower reaches of the chains, a series of stationary spacer plates 242 may be provided, the number of spacer plates being equal to the number of chains. The spacer plates are fitted between each pair of sprockets in coplanar relationship thereto, with the upper and lower edges 244 and 246 of each plate contacting and backing up the chain links intermediate the supporting sprockets.

A chain or detent carrier such as 240 may be constituted of double links 248 and single links 250 arranged in alternation, with the single links pivoted to and sandwiched between the identical halves of the double links. The single links may extend inwardly of the chain orbit, to ride within recesses such as 252 provided at one side of a spacer plate 242, along the chain back-up edges 244 and 246. The single links ride in the recesses 252, while the double links ride upon back-up edges 244 and 246.

The shaft 228 carries a number of freely rotatable chain guide wheels 254, each of which is loosely accommodated in a spacer plate aperture 256. Wheels 254 have grooved peripheries to receive the inward extensions of single links 50, thereby to preclude any lateral displacement of the chain intermediate its supporting sprockets. A guide wheel 254 is provided for each chain 240.

It may here be noted that some of the single links 250 carry outwardly projected detents 64, which, as was previously mentioned, may backstop a punch as shown at 64 in FIG. 2, to render the punch operative for slotting a data card of web W. Each of the nine chains or carriers 240 carries several detents 64.

The sprockets 236 and 238 are accurately formed and dimensioned to assure a smooth and accurate chain advancement free of play or backlash. Accordingly, a sprocket such as 238, FIG. 4, may comprise two outer discs 258, 258, and an inner disc 260, sandwiched together and secured to form an integral structure. The outer discs have alternate straight edges 262 and outwardly projected stubs 264. The straight edges 262 accurately accommodate the double links of chain 240, while the stubs 264 project into the spaces between successive double links. Where the stubs are located, there is a space between the outer discs, for entry of the inward projection of a single link 250.

The inner or intermediate disc 260 of the sprocket may be provided with equally spaced outwardly projected teeth 266, adapted to enter the spaces between the members of the double links. Teeth 266 may accurately abut the pivoted portions of adjacent single links as the links seat upon the shaped peripheries of the sprocket constituents. The chain and sprocket construction as above described assures a smooth and accurate motion transmission, with the use of extremely narrow but durable chains and sprockets.

In order that no sag may occur in the lower reaches of chains 240, the lower reaches may be supported upon a gang of tightly stretched parallel wires 268, spaced apart to support the double links of the chains while permitting the detents 64 to project downwardly beyond the mean plane of the wire gang. FIG. 2 as well as FIG. 4, shows the wires 268 and their relationship to a chain 240 and a detent 64.

Wires 268 may be secured at opposite ends thereof in tension bars 270, 270, to be firmly supported at the opposite ends of the housing rails 222, 224. The tension bars may be drilled as at 272 and provided with adjustable screws or keys 278 similar or equivalent to those employed for tensioning piano wires. Spacer bars shown at 274 may be drilled to receive the wires 268 and maintain them in accurately spaced relationship, said bars being received in channels 276 of the tension bars, wherein the spacer bars are suitably anchored. Screws such as 280 may be employed to firmly fix the tension bars 270 upon opposite end portions of the rails 222, 224.

The gang of tension wires, which may be piano wires, provides a virtually frictionless firm support for the double links in the lower reaches of chains 240, even though wear of the linkage may slacken the chains in time. The wires establish the clearance at which all detents 64 may pass over the upper ends of punches P during advancement of the chains 240.

It is noted that the punch backstop unit 40 includes nine chains 240 arranged in spaced parallelism. One of the chains, an endmost one of the group, is disposed beneath the star wheel 110 of units digit counter 34 (FIG. 3). The teeth of star wheel 110 (FIG. 2), are constantly intermeshed with some of the links of the endmost chain, at a location directly above sprocket 236, whereby step-rotation of the star wheel is transmitted to the chain mentioned.

With each cycle of movement of actuator bar 88, units digit counter star wheel 110 advances its associated chain a distance equal to the spacing of punches P, FIG. 2, so that a detent 64 will stop over each of the ten free punches in succession from left to right. The spacing of detents 64 on said chain is such that a detent is always overlying a free punch; that is, when a detent leaves the last punch at the right in FIG. 2, another detent moves into position over the first free punch at the left in FIG. 2. The chain here mentioned may be termed the units digit chain, carrying units digit detents.

From the foregoing it will be understood that a detent 64, in stopping over any punch momentarily, conditions that punch for penetration of the card of web W, the penetration occurring when the punch head and the die head come together against the web. When the punching device is in operation, the penetration occurs coincidentally with each cycle of actuator bar movement.

It should be understood further, that actuation of the punches of FIG. 2 in succession, from left to right, will produce slots in successive data cards representing, by reason of orientation to the card edges, the digits 1, 2, 3, 4, 5, 6, 7, 8, 9 and 0. When the 0 unit digit punch performs, the numeral 10 is to be represented, requiring a simultaneous performance of a punch associated with the 10's counter head 36 for punching a slot representing a digit 1 which, with the digit 0, represents the numeral 10. Accordingly, counter 36 will at this time locate a detent of the second chain over a punch in the second row representing the numeral 1, so that a punch and die head actuation will effectuate two simultaneous punchings, one representing the numeral 1 and the other representing the numeral 0, or "10" when regarded as a whole number.

Continuing, the two counter heads together may punch slots in the data cards representing numbers from 10 to 99, inclusive, the counter head 36 operating to advance a detent such as 64 along its associated row of punches, at a rate which is one-tenth the rate of advancement of the digits counter head detent. That is, a detent of the 10's counter head 36 will advance from one punch to the next, over the second row of punches, upon every complete traverse of all punches in the first row of punches by a detent of the digits counter chain.

After the digits and 10's counters (34 and 36) have operated to punch the 99th data card of the web, the 100's counter head 38 will be required to place a detent such as 64 over the first free punch of the third row of punches, to assure the punching of a slot in the next data card representing the numeral 1 while the counters 34 and 36 punch slots representing 0's (zeros). Thus, operation of the three counters simultaneously conditions three punches for the production of three slots in the 100th card, representative of the numeral "100."

The detent of the third chain will remain over its first punch until the 199th data card has been punched, and then the 100's counter will be actuated to advance its chain detent over the second punch of the third row of punches, to assure punching a slot in the 200th card representing the numeral 2 while counters 34 and 36 place their detents over the 0 (zero) representing punches, so that the three counters will effectuate simultaneous punchings of one each, oriented to the card edges for representing the number "200." After 99 more punchings, the detent controlled by counter 38 will move to the third punch in the third row of punches, to begin the "300" series of punches. When by reason of nine steppings of 100's counter 38, the 999th card has been punched with three slots representing the number 999, counter 36 will be sequired to advance the fourth chain, for placing a detent over the first punch of the fourth row of punches, to assure punching the 1000th data card with a slot to represent the numeral 1 while at the same time the counters 34, 36 and 38 will place detents over the last punch in the first, second, and third rows of punches to assure three punchings each representing a "0" (zero). The three zeros and the 1 will be represented by punches of the first, second, third and fourth rows of punches, actuated simultaneously to slot the 1000th card in four places, with the slots oriented to the card edges for representing the number "1000."

After the 1000 card has been slotted as stated, successive cards will be slotted to represent the numbers 1001, 1002, 1003, etc., until the groups of four slots in each successive card receive punchings representative of the number 9999. As the 10,000th card reaches the punch and die area, counter 38 will operate to place a detent of the fifth chain 240 over the first punch of the fifth row of punches, to assure placement of a slot in the card representative of the numeral 1, while counter 34 places a detent over the 10th punch of the first row of punches.

At the same time, counter 36 will place a detent over the 10th punch in each of the second and fourth rows of punches, and counter 38 will place a detent over the 10th punch in the fourth row of punches. The result of this will be to punch the 10,000th card with five slots, all oriented to the card edges for representing the number 10,000.

After 99,999 data cards have been punched and slotted, each with five slots differently oriented, counter 36 will operate a place a detent of the sixth chain over the first punch of the sixth row of punches, to assure placement of a slot in the 100,000th card representative of the numeral 1, while a group of five zeros is represented by punchings produced by the tenth punch in each of the first, second, third, fourth, and fifth rows of punches, the tenth punch of each of said rows being backstopped each by a detent such as 64. Counter 34 will operate to place one detent over the zero punch in the first row of punches and counters 36 and 38 will operate to place two detents over the zero punches in the second and fourth, and the thrid and fifth rows of punches, respectively.

By referring to FIG. 3, it will be noted that counter heads 36 and 38 are offset relative to one another, and to the side rails of punch backstop unit 40. The purpose of this is to place the four chain-driving star wheels of head 36 in driving relationship with the second, fourth, sixth, and eighth chains of unit 40, while placing the four chain-driving star wheels of head 38 in driving relationship with the third, fifth, seventh and ninth chains of unit 40. The star wheel 110 of counter head 36 drives only the first chain of unit 40. As in all conventional counter heads, the counter wheels step-advanced by the driving pawls, drive one another progressively, that is, the 10's wheel at one complete rotation advances the 100's wheel one step; the 100's wheel at one complete rotation advances the 1000's wheel one step; the 1000's wheel at one complete rotation advances the 10,000's wheel one step, and so on. In the case of the digits counter wheel as herein employed, the digits wheel simply drives the first chain only, to place backstop detents over the ten free punches of the first row of punches, in regular 1, 2, 3, 4, 5, 6, 7, 8, 9 and 0 progression.

In the embodiment illustrated, the length of each chain 240, as established by the size and spacing of the supporting sprockets 236 and 238, supports five detents such as 64 equally spaced apart. The distance from one detent to the next, along each chain, is so related to a row of ten punches, that one detent only of a chain may backstop a punch at any given time. However, when said one detent of a chain moves beyond the last punch of a row, a following detent of the same chain will move into position to backstop the first punch of the same row, so that one punch of a row of punches will be backstopped by a detent at all times. The stepping advancement of the chain detents, as effected by the driving pawl of a counter head, is equal to the distance from the center-line of one punch to the center-line of the next adjacent punch.

In very high speed card-punching machines, it may be considered desirable to employ two card punching devices of the type illustrated in the accompanying drawings, operating in alternation to punch alternate cards of a moving web. In that event, one punching device may punch out slots representing the even numbers of a data card sequence, while the second punching device punches out slots representing odd numbers of the sequence. Under such an arrangement, the driving pawls and ratchet wheels of the several counter heads of the punching devices may be modified so as to drive the units chain 240 in steps which are enlarged, so that the detents will backstop alternate punches of a row with each complete cycle of movement of an actuator bar 88.

The star wheels of the several counter heads, four of which are identified in FIG. 6 by the reference characters 130, 152, 172 and 192, may be each constructed of three metal stampings pinned or welded together in flatwise abutment, each stamping being provided with equally spaced teeth 282. The teeth of the outer two stampings are in register with each other to form pairs, leaving a space between them equal to the thickness of the middle stamping. The pairs of teeth are spaced about the star wheel periphery so as to straddel successive single links 250 (FIG. 4) of a chain 240, with the teeth of the star wheel pair abutting the ends of successive double links 248.

The single teeth of the middle stamping of the star wheel, are adapted to enter the spaces between the double links 248, for driving against the ends of the single links 250. Thus the chain is advanced by a star wheel having teeth which engage both the single links and the double links of the chain, resulting in a smooth and accurate chain driving assembly. As FIG. 2 clearly indicates, a star wheel such as 110 may drive the chain 240 with great precision, and the drive may be effected at that portion of the chain which is supported upon a sprocket such as 236, without interference from the sprocket teeth.

The counter head 38 of FIG. 9 has not been described in detail, for as previously stated, this counter head is practically a duplicate of counter head 36. It may be of benefit in reading the drawings, however, to briefly identify the parts of counter heads 38. The reference character 284 denotes the driving pawl, which is similar to pawl 114 of FIG. 6, and which is rockable by means of actuating bar 88 through rocker lever 286. Pawl 284 drives the nine ratchet wheels on rocker shaft 104 in stepping fashion, just as in FIG. 6. Four of the ratchet wheels carry gears 288, 290, 292 and 294, which in turn drive the intermediate gears 296, 298, 300, and 302, respectively, rotating on shaft 304. Shaft 304 corresponds to shaft 206 of FIG. 6.

The intermediate gears on shaft 304 mesh with gears on shaft 306, to step-rotate the four star wheels 308, 310, 312 and 314, which star wheels are identical to the star wheel 192 of FIG. 6.

Counter head 38 rests atop the punch backstop unit 40, in laterally offset relationship thereto as previously explained, for aligning and meshing the four star wheels of head 38 with the third, fifth, seventh and ninth chains 240 of the punch backstop unit. As before explained, the chains are step-advanced by the star wheels for placing the backstop detents 64 thereof over those punches P to be activated in the sequential punching of the data cards constituting web W. In all respects, the mechanical operation of counter head 38 is the same as that of counter head 36.

In the representation of a data card, FIG. 10, punched holes or slots are indicated by the numerals 3, 5 and 8, to identify the card as card No. 358 of a sequence. The small rectangles dotted in above the numerals 0, 1, 2, 4, 6, 7 and 9, represent the possible locations of slots that might be formed in the card by punches other than those which punched the slots 3, 5 and 8. In practice, slots formed in the card to represent the numerals 0, 1, 2, 4, 6, 7 and 9, would not be arranged in a straight line parallel to the top edge of the card as indicated upon FIG. 10, but would instead be located at different distances from the top edge, while retaining the indicated spacing from a side edge of the card. That is, a "7" slot for example, will always be spaced three slots distant from the left edge of the card, but may appear at different distances from the top edge, depending upon the location of the "7" in a compound number by which the card is to be identified.

The data card punching device of the present invention is seen to possess the advantages of extraordinary compactness and light weight. Moreover, it is a unitary assembly that can easily be carried about, and fixed in position quickly upon any web-feeding machine. In the event of any malfunctioning of the punching device in service, it may quickly and easily be removed from the web-feeding machine as a unit, and replaced by another without serious or extended loss of production time. Other advantages characterizing the device are set forth in the objects stated in the introductory portion of the specification.

It is to be understood that various modifications and changes may be made in the structural details of the device, within the scope of the appended claims, without departing from the spirit of the invention.

What is claimed is:

1. A data card punching device for perforating a long succession of rectangular cards movable in web formation, to distinguish every card one from another by virtue of the number and the orientation of the perforations with respect to the card edges, said punching device being a unitary structure including a punch head carrying a multiplicity of punches, a head including a die for receiving the punches to form the perforations in interposed cards, and operating means to actuate the punches in a predetermined order for orienting the card perforations to represent successive numbers for successive cards undergoing perforating, said operating means comprising a plurality of counter heads each of which includes a rocker shaft lever having an exposed free end, and a single actuator bar movable between two limits of travel, said actuator bar being operatively associated with the free ends of all the rocker shaft levers, for transmitting motion of the actuator bar to said levers in unison.

2. The device according to claim 1, wherein the unitary structure includes means for actuating said operating means in synchronism with movement of the web between the punch and die heads.

3. A data card punching device for perforating a long succession of rectangular cards movable in web formation, to distinguish every card one from another by virtue of the number and the orientation of the perforations with respect to the card edges, said punching device comprising a unitary structure including a punch head having a multiplicity of punches, a head including a die for co-operating with the punches to form the perforations in cards passed between the heads, a gang of counters having actuator elements operative in unison, and in synchronism with movement of the web between the punch and die heads, and a punch backstop unit interposed between the punch head and the gang of counters, operative to condition selected ones of the punches for perforating the cards of the web following an advancement of the web between said heads.

4. The device according to claim 3, wherein the gang of counters determines the selection of punches to be conditioned by said punch backstop unit.

5. A data card punching device for perforating a long succession of rectangular cards movable in web formation, to distinguish every card one from another by virtue of the number and the orientation of the perforations with respect to the card edges, said punching device comprising a punch head and a head including a die, said heads being relatively movable toward and from one another, with a card of the web interposed for perforating, a multiplicity of punches reciprocably supported by the punch head in parallel rows and in columns transverse to the rows, said punches being uniform in length and having butt ends disposed in a common plane, and each having a cutting end to enter the die, the punches being supported with their cutting ends disposed normally in a common plane at an initial web-perforating level, but subject to reciprocation to a second level by contact of the cutting ends with the web as the heads move relatively toward one another, means operating in synchronism with the web movement for relatively moving the punch and die heads as stated, and detent means movable linearly of a row of punches in parallelism with the plane which includes the butt ends thereof, said detent means being movable in synchronism with said head movements, for intercepting the butt ends of selected punches and precluding movement thereof to the second level aforesaid incident to contact with the web, whereby to enforce penetration of the web by the cutting ends of the selected punches.

6. The device according to claim 5, wherein each row of punches has associated therewith a separate movable detent means for precluding selected punches of a row from moving to the second level aforesaid.

7. A data card punching device for perforating a long succession of rectangular cards in movable web formation, to distinguish every card one from another by virtue of the number and the orientation of the perforations with respect to the card edges said punching device comprising a punch head and a head including a die, said heads being relatively movable toward and from one another, with a card of the web interposed for perforating, a multiplicity of punches reciprocably supported by the punch head in parallel rows and in columns transverse to the rows, said punches each having a cutting end to enter the die, and a butt remote from the die, the butts of all the punches being normally coplanar at an initial level but subject to elevation to a second level by contact of the cutting ends with the web as the heads move relatively toward one another, means operating in synchronization with the web movement for relatively moving the punch and die heads as stated, and detent means movable unidirectionally in spaced parallelism with the plane which includes the butt ends of the punches, said detent means being movable in synchronism with the punch and die head movements, for intercepting selected ones of the punch butts in their movement toward the second level, to preclude reciprocation of the selected punches relative to the punch head for enforcing projection of the cutting ends of the selected punches through the web and into the die as the heads move toward one another.

8. The device according to claim 7, wherein each of the several rows of punches has associated therewith a separate movable detent means operative to intercept selected punch butts of a row of punches.

9. A data card punching device for perforating a long succession of rectangular cards in web formation, to distinguish every card one from another by virtue of the number and the orientation of the perforations with respect to the card edges, said punching device comprising a punch head and a die head relatively movable toward and from one another, with a card of the web interposed for perforating, a multiplicity of punches reciprocably supported by the punch head in parallel rows and in columns transverse to the rows, said punches each having a cutting end to enter the die, and a butt end remote from the die, the butt ends of all the punches being normally coplanar, a plurality of movable detent carriers equal in number to the number of punch rows, and means supporting said carriers each in the plane of a row of punches, with the carriers spaced from the butt ends of the punches, detent means carried by each carrier, to backstop the butt ends of the punches of a row in succession as the movable carriers advance over the row of punches, means operative intermediate each punch and die head perforating action, for step-advancing one carrier and its detent means successively over the butt ends of the punches of one row of punches, for backstopping the punches of said one row in succession to preclude reciprocation of the backstopped punches during the perforating action of the punch and die heads, and means operative at less frequent intervals for step-advancing the remaining carriers and their detent means progressively over the butt ends of the remaining rows of punches, to backstop the punches of said remaining rows in succession while the perforating action is in progress.

10. The device according to claim 9, wherein the means for step-advancing the carriers and their detents includes a plurality of counter heads operative in alternation with the perforating actions of the punch and die heads.

11. A data card punching device for perforating a long succession of rectangular cards movable in web formation, to distinguish every card one from another by virtue of the number and the orientation of the perforations with respect to the card edges, said punching device comprising a punch head and a head including a die, means for moving said heads relatively toward and from one another, with a card of the web interposed for perforating, a multiplicity of spaced parallel punches reciprocably supported by the punch head in parallel rows, said punches each having a cutting end to enter the die, the punches being supported with their cutting ends disposed normally in a common plane at an initial web-perforating level, but subject to reciprocation to a second level farther from the die, by contact of the cutting ends with the web as the heads move relatively toward one another, a plurality of synchronized counters each having an actuating element movable in synchronization with advancement of the web between the punch and die heads, and means controlled by the counters for immobilizing selected punches of the several rows in their movement from the initial normal level to the second level aforesaid, in a predetermined order of selection established by the counters.

12. The device according to claim 11, wherein the means last mentioned comprises a plurality of endless chains, sprockets supporting the chains with each chain overlying all of the punches of a row of punches, detent means carried by each chain for disposition over the individual punches to backstop the punches against shifting from the initial level to the second level aforesaid, and means associated with the counters for step-advancing the chains, to dispose their respective detents in backstopping relation to successive punches of a row of punches.

13. A data card punching device for perforating a long succession of rectangular cards movable in web formation, said device comprising a punch head and a head including a die, means for moving said heads relatively toward and from one another, with a card of the web interposed for perforating, a multiplicity of spaced parallel punches equal in length and reciprocably supported by the punch head in parallel rows, the punches of each row being ten in number, to represent in succession the digits 1 through 9 followed by zero, said punches each having a cutting end to enter the die, the punches being supported with their cutting ends disposed normally in a common plane at an initial web-perforating level, but subject to reciprocation to a second level farther from the die, by contact of the cutting ends with the web as the heads move relatively toward one another, a plurality of synchronized counters having actuating elements movable by steps in synchronization with advancement of the web between the punch and die heads, movable detent means associated with each row of punches, and means associated with the counters for advancing the detent means in stepping fashion to successively intercept and backstop the punches of a row in the order 1 through 9 followed by zero, repeatedly, for immobilizing the intercepted punches and precluding movement thereof from the initial normal level to the second level aforesaid, thereby to condition the intercepted punches for penetrating and perforating the web.

14. The device according to claim 13, wherein actuation of the coutners with relation to one another, initiates a progression of punch actuations upon the cards representative of a regular succession of numerals beginning with the digit 1, and terminating with a number limited by the scope of number projection of the counters.

15. The device according to claim 13, wherein the movable detent means comprises a plurality of endless movable chains, and a pair of sprockets supporting each chain, with a reach of each chain overlying all of the punches of a row in spaced relation, said detent means being carried by each chain for disposition over the punches in succession, to immobilize the punches as and for the purposes stated.

16. A web perforating device comprising in combination: a row of punches reciprocable in a common plane between an extended position and a retracted position, each of said punches having a cutting end and a butt end, with the butt ends normally disposed at one common elevation, and the cutting ends normally disposed at a second common elevation, means for reciprocating the punches in unison from one of said positions to the other and a traveling detent movable in synchronism with the reciprocating means, to successively backstop the butt ends of successive punches and preclude reciprocation of the backstopped punch with the remaining punches of the row.

17. The device according to claim 16, wherein the aforesaid means for reciprocating the punches includes the web to be perforated.

18. In a card perforating device, the combination of a row of spaced punches reciprocable in a common plane between an extended position and a retracted position; a counter head including a rotary ratchet wheel, and a driving pawl for step-rotating the ratchet wheel in one direction of rotation; an endless linked chain; a pair of coplanar spaced sprockets supporting the chain for disposition of one reach of the chain in spaced parallelism with all punches of the row of punches; a plurality of punch backstop detents carried by the chain and movable therewith to positions overlying the punches in succession for backstopping the punches successively against reciprocatory movement; means for transmitting the step movements of the ratchet wheel to the chain for successively moving the detents a distance equal to the distance between the center-line of one punch and the center-line of the next adjacent punch, the linear distance between successive detents on the chain being gauged to the length of the row of punches so that at all steps of advancement of the chain one detent will backstop one punch of the row of punches.

19. The device according to claim 18, wherein the combination includes a pair of spaced parallel wires tensioned between the punches and said one reach of the chain, said wires being spaced apart and positioned to support said chain reach against sagging toward the row of punches.

20. In a card perforating device, the combination of a row of spaced punches reciprocable in a common plane between an extended position and a retracted position, said punches each having a cutting end and a butt, the cutting ends being normally coplanar, and the butts being normally coplanar; a counter head including a rotary ratchet wheel, and a driving pawl for step-rotating the ratchet wheel in one direction of rotation; an endless chain comprising a series of connected links; a pair of coplanar spaced sprockets supporting the chain for disposition of one reach of the chain in spaced parallelism with the butts of the punches; a plurality of punch backstop detents carried by the chain and movable therewith to positions overlying the punch butts in succession for backstopping the punches successively against reciprocatory movement; means including a star wheel in engagement with the links of the chain, for transmitting the step movements of the ratchet wheel to the chain for successively moving the chain and its detents a distance equal to the distance between the center-line of one punch and the center-line of the next adjacent punch, the linear distance between successive detents on the chain being gauged to the length of the row of punches so that all steps of advancement of the chain, one detent will always be in position to backstop one only of the punches of the row.

21. The device according to claim 20, wherein the combination includes means comprising the web to be perforated, for moving the reciprocable punches to the retracted position.

22. In a card perforating device, the combination of a punch head having an upper element and a lower movable element normally in spaced parallelism, and yielding means normally maintaining said elements at maximum separation; a straight row of elongate punches of equal length each having a cutting end and a butt end, and guide means on said elements supporting the punches in equally spaced parallelism for longitudinal reciprocation, with the cutting ends in one common plane and the butt ends in another common plane; a punch backstop unit fixed to the upper element of the punch head, said unit including a traveling detent for backstopping the butt ends of the punches in succession, to preclude reciprocation of the backstopped punches as the lower punch head element moves from the position of maximum separation toward the upper element of the punch head.

23. The device according to claim 22, wherein the combination includes a die head to support the card to be perforated, and having apertures therein to receive the cutting end of a punch backstopped by the detent; and means for moving the die head in the direction of and against the lower element of the punch head, to move said lower element toward the upper element against the resistance of the yielding means aforesaid.

24. In a web perforating device, the combination of a punch head having an upper element and a lower movable element normally in spaced parallelism, and yielding means normally maintaining said elements at maximum separation; a straight row of elongate punches each having a cutting end and a butt; guide means on said elements supporting the punches in equally spaced parallelism for longitudinal reciprocation, with the cutting ends in one common plane and the butts in another common plane; a counter head including a rotary ratchet wheel, and a driving pawl for step-rotating the ratchet wheel in one direction of rotation; detent means unidirectionally advanceable to backstop in regular succession the butts of the punches of the row of punches, for limiting reciprocatory movement of the backstopped punches in one direction; and means for transmitting to the detent means the step movements of the ratchet wheel, successive movements of the detent means being gauged to the space between one punch butt and the butt of the next adjacent punch, so that each step movement of the ratchet wheel advances the detent means successively to backstop the punches one by one in a regular predetermined order.

25. The device according to claim 24, wherein the combination includes: a die head to support the web for perforating, said die head being movable in the direction of and against the lower element of the punch head, for moving said lower element toward the upper element against the resistance of the yielding means aforesaid.

26. A counter head adapted for the control of a perforating device, said counter head comprising a body; a driving shaft and a terminal shaft supported by the body; a rotary ratchet wheel carried by the driving shaft, and means for step-rotating the ratchet wheel in one direction of rotation; a wheel on the terminal shaft including teeth for imparting motion to a movable endless chain; and means for transmitting to the wheel the step-rotations of the sprocket wheel.

27. A counter head adapted for the control of a perforating device, said counter head comprising a body; a ratchet wheel rotationally supported upon the body means for step-rotating the ratchet wheel in one direction of rotation; and means on the body actuated in stepping fashion by the ratchet wheel, for driving a movable endless chain in control of a series of perforating punches.

28. In a perforating device, the combination of a counter head comprising a body; a ratchet wheel rotationally supported upon the body; means for step-rotating the ratchet wheel in one direction of rotation; a movable endless chain, and means supporting the chain for advancement by steps; and means for transmitting to the chain the step-rotations of the ratchet wheel.

29. The combination according to claim 28, wherein is included: a row of movable punches aligned with the chain; and detent means on the chain for intercepting movement of selected ones of the row of punches as the chain assumes various positions determined by the ratchet wheel rotations.

30. In a perforating device, the combination of a row of movable equally spaced punches; a traveling chain having a reach disposed in spaced parallelism with all the punches of the row; detent means carried by the chain for intercepting the punch movements; and means for driving the chain by steps, to place the detent means in intercepting relation to the punches in succession.

31. In a card perforating device, the combination of a row of punches equally spaced apart, said punches being individually reciprocable in a common plane between an extended position and a retracted position; an endless linked chain, and a pair of coplanar spaced rotational sprockets supporting the chain for disposition of one reach of the chain in spaced parallelism with all the punches of the row; a plurality of punch backstop detents carried by the chain and movable therewith to positions overlying the punches in succession for backstopping the punches successively against reciprocatory movement, successive ones of said detents being spaced apart upon the chain so that the distance between the centerlines of said successive detents is equal to the distance between the centerlines of the first and last punches of the punch row, plus the distance from the centerline of one punch to the centerline of a next adjacent punch; and means for advancing the chain in one direction intermittently in increments of linear movement equal to the distance between the centerlines of any two adjacent punches.

32. The device according to claim 31, wherein the total length of the chain is an exact multiple of the spacing between any two successive detents measured linearly at the centerlines of said two successive detents.

33. A chain and sprocket motion-transmission device, comprising: a chain including a series of double links and a series of single links arranged in alternation, all of said links having opposite ends; pivot means connecting opposite ends of the single links to adjacent ends of the double links, with the ends of the double links flanking the ends of the single links; a rotary sprocket to support the chain, said sprocket having a series of circumferential single teeth, and a series of circumferential double teeth, the double teeth being spaced apart axially of the sprocket to receive therebetween the single links of the chain, with the single teeth of the sprocket disposed in the plane of the single links of the chain; the thickness of the sprocket being approximately equal to the thickness of the chain, with the ends of the single links disposed in the driving contact with the single teeth of the sprocket, and the ends of the double links disposed in driving contact with the double teeth of the sprocket, said double teeth flanking the single links of the chain intermediate the pivot means connecting each double link with a single link of the chain.

34. The device according to claim 33, wherein the sprocket in the planes of the double teeth, includes flat circumferential chordal portions to support the double links of the chain trained about the sprocket.

35. A chain and sprocket motion-transmission device, comprising: an endless chain including a series of double links and a series of single links arranged in alteration, all of said links having opposite ends; pivot means connecting opposite ends of the single links to adjacent ends of the double links, with the ends of the double links flanking the ends of the single links; a pair of rotary sprockets about which the chain is trained in taut condition, each of said sprockets comprising two outer discs and an intermediate disc in flatwise abutment, the intermediate disc having formed circumferentially thereon a series of teeth spaced apart to project between the double links of the chain and engage the ends of the single links thereof; a series of teeth on each of the outer discs, arranged in pairs to embrace between the pairs the single links of the chain, the teeth of the pairs being spaced circumferentially to engage the ends of the double links of the chain at opposite sides of the single links.

36. The device according to claim 35, wherein some of the single links of the chain are provided with integral detents projected outwardly beyond the limit of travel of the double links.

References Cited
UNITED STATES PATENTS

| | | | |
|---|---|---|---|
| 1,201,748 | 10/1916 | Luce | 74—243 |
| 2,645,944 | 7/1953 | Carroll | 234—61 |
| 3,029,654 | 4/1962 | Hill | 74—216.5 |
| 3,079,071 | 2/1963 | Staneck | 234—61 |

GERALD A. DOST, *Primary Examiner.*